INVENTORS:
E. W. LARSEN
BY  B. L. WRIGHT
C. B. Hamilton
ATT'Y.

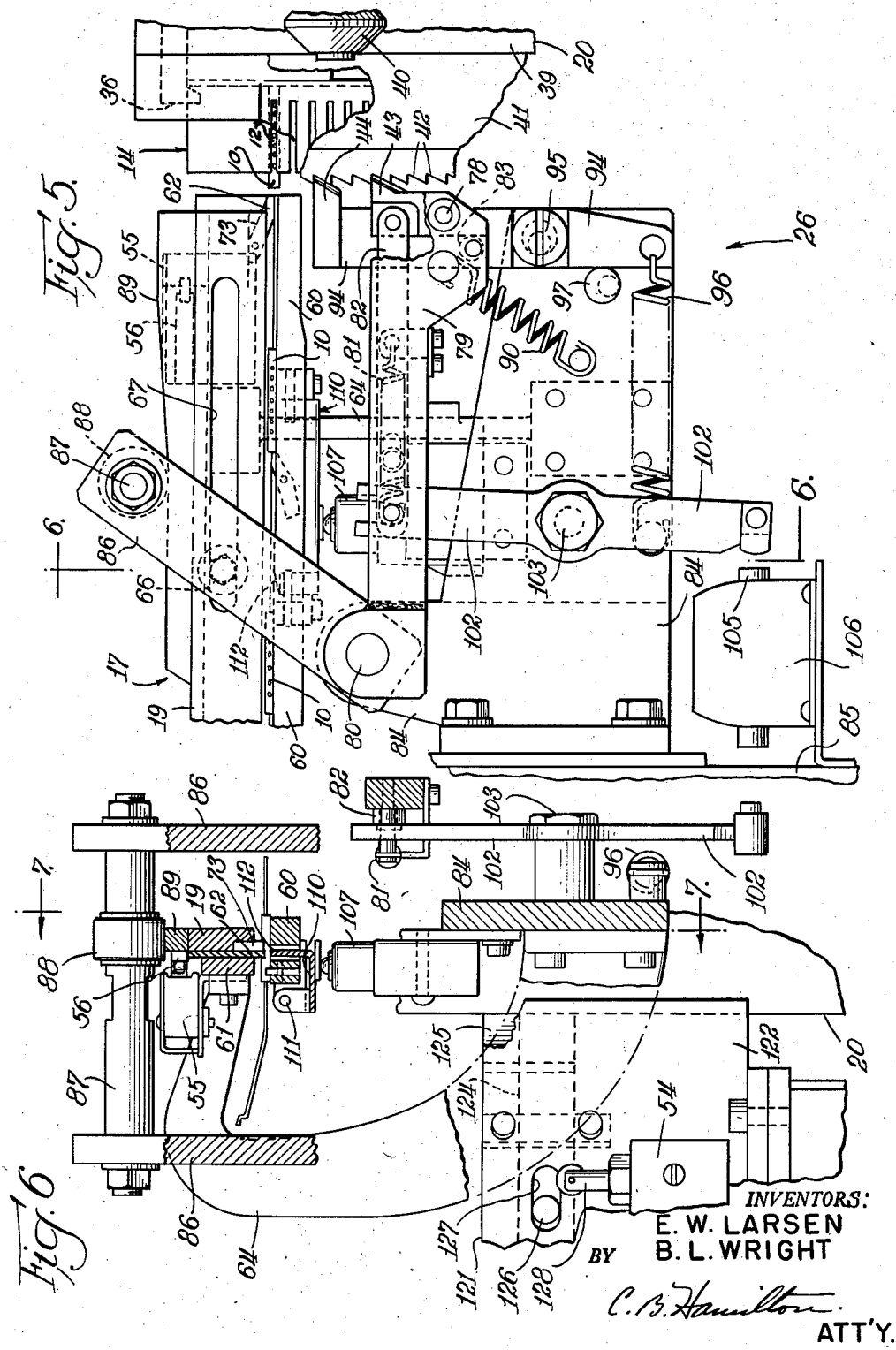

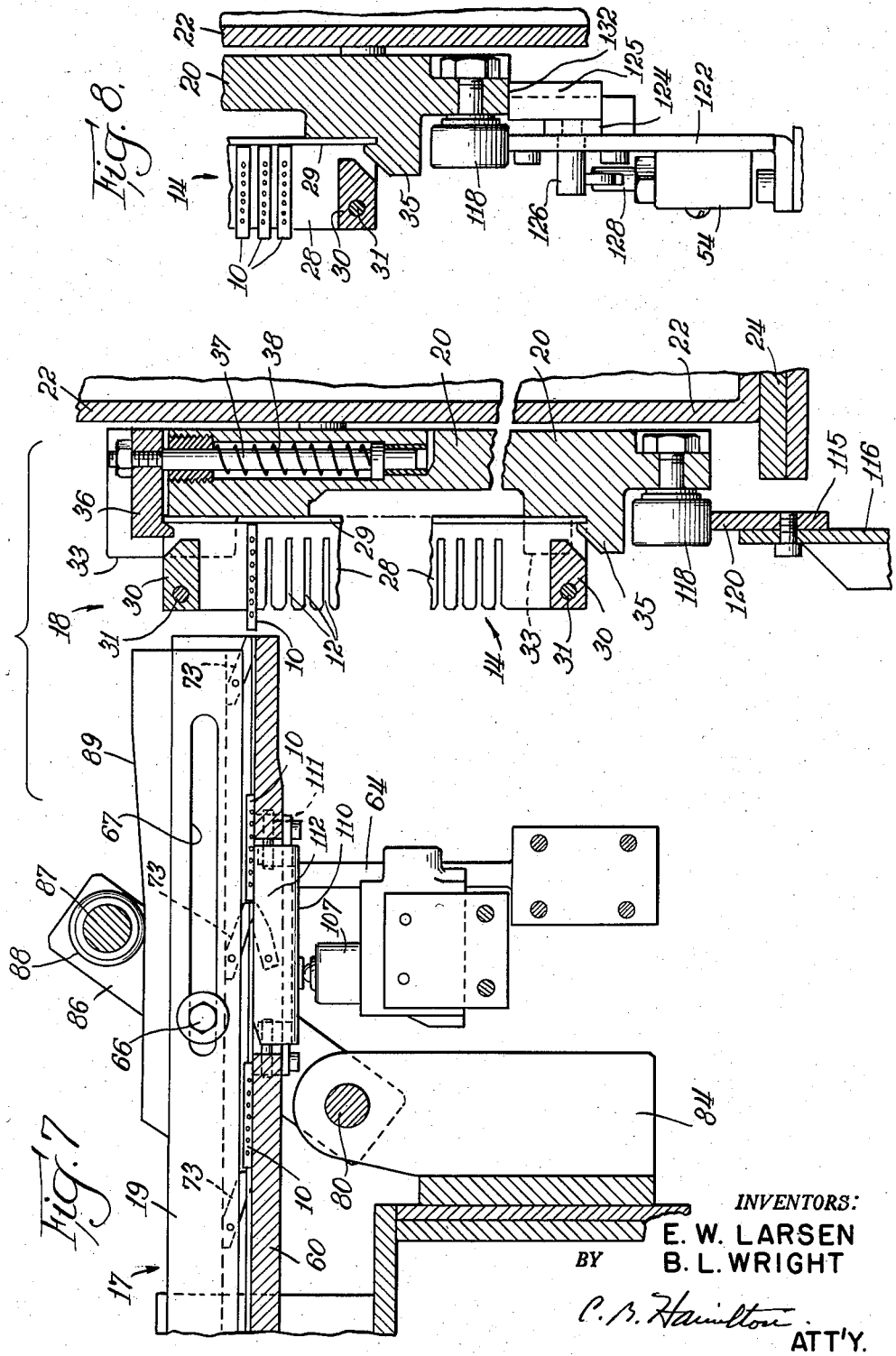

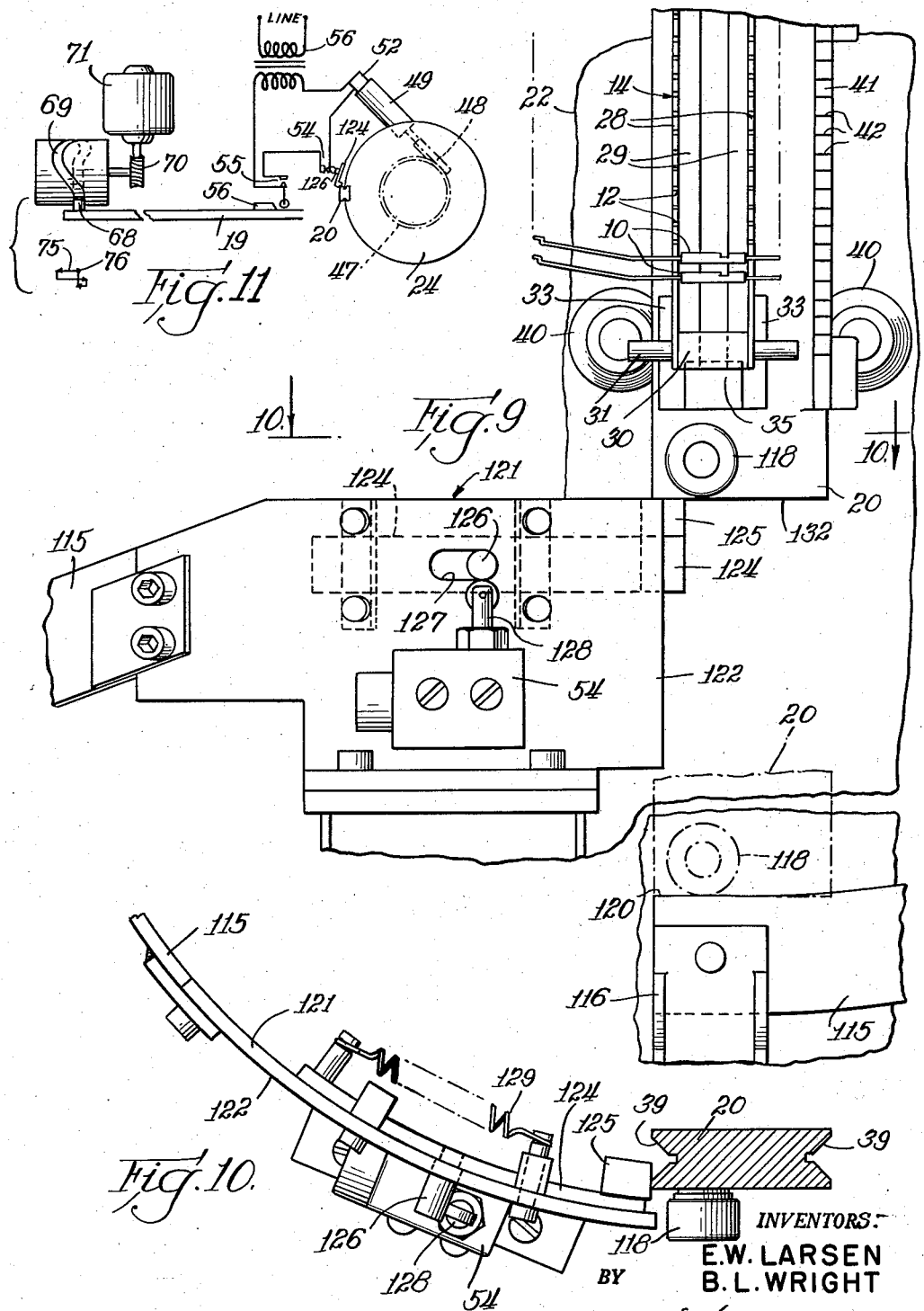

United States Patent Office 2,846,832
Patented Aug. 12, 1958

2,846,832

APPARATUS FOR CONTINUOUS LOADING OF ARTICLES INTO MAGAZINES

Einer W. Larsen, Elmhurst, and Ben L. Wright, Des Plaines, Ill., assignors to Western Electric Company, Incorporated, New York, N. Y., a corporation of Delaware Application July 28, 1954, Serial No. 446,312

12 Claims. (Cl. 53—60)

This invention relates to apparatus for loading articles into magazines and more particularly to mechanism for automatically advancing successive empty magazines to a station and raising them step by step as parts are successively loaded into a row of recesses therein.

An object of the invention is to provide a mechanism for automatically loading articles into successive recesses in a magazine.

Another object of the invention is to provide a mechanism for automatically advancing successive magazines to a loading station and feeding successive articles into successive ones of a plurality of receiving recesses therein.

A mechanism illustrating certain features of the invention for loading articles into successive recesses in magazines may include a rotary feed table for supporting a plurality of vertically movable carriers on which the magazines are removably mounted, and advancing successive magazines and carriers to a loading station in the path of travel of a reciprocable feed bar which intermittently advances a row of uniformly spaced switch parts on a stationary track and ejects successive parts therefrom into a magazine in the loading station. An elevating mechanism actuated by a cam on the reciprocable feed bar raises the magazine and magazine carrier step by step to align successive recesses therein with the switch parts being ejected, and a control device renders the elevating mechanism ineffective when a switch part is not present on the track in a position to be ejected into the magazine. In response to the loading of the last switch part into a magazine a control circuit is closed to effect the indexing of the feed table to move an empty magazine at a low level into the loading station and to move the full magazine therefrom at a high level. The magazines and carriers ride on a helical cam track and as the feed table is indexed, they are lowered progressively from the high elevation to the low elevation at the loading station. A magazine filled with switch parts may be removed from a carrier and replaced by an empty one.

Other objects and advantages of the invention will become apparent by reference to the following detailed description and the accompanying drawings illustrating a preferred embodiment thereof, in which:

Fig. 5 is an enlarged fragmentary side elevational view of a portion of the mechanism for elevating the magazine;

Fig. 6 is a vertical sectional view taken along the line 6—6 of Fig. 5;

Fig. 7 is a vertical fragmentary sectional view taken along the line 7—7 of Fig. 2 and showing a magazine in its lowermost position;

Fig. 8 is a fragmentary vertical sectional view similar to Fig. 7 showing the magazine in its uppermost position;

Fig. 9 is a fragmentary elevational view of a portion of the apparatus looking in the direction of the arrows 9—9 of Fig. 2;

Fig. 10 is a fragmentary plan sectional view taken along the line 10—10 of Fig. 9 with parts in a different position; and Fig. 11 is a diagrammatic view of the drive for a portion of the apparatus.

Figure 4:
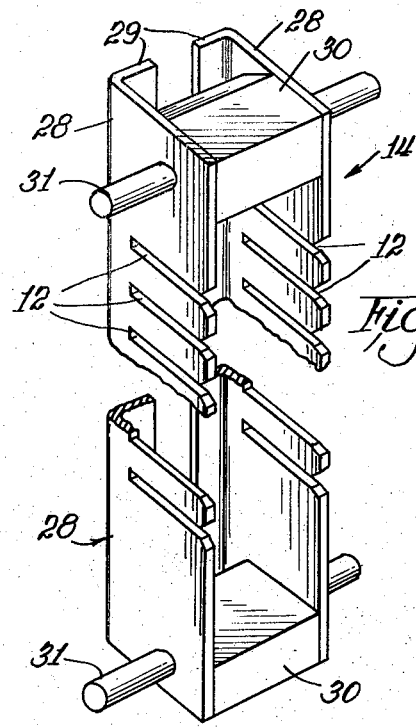
Fig. 4 is a fragmentary perspective view of the magazine for holding the switch parts.
Figure 3:
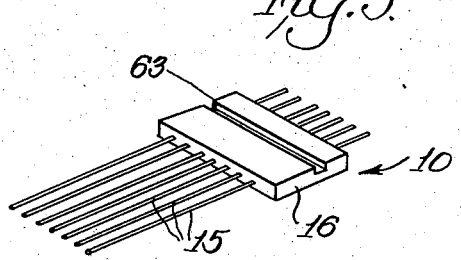
Fig. 3 is a perspective view of a switch part which is loaded into the magazine by the present apparatus.

The present apparatus is designed to load a plurality of articles or switch parts 10 (Fig. 3) into successive recesses 12 of successive magazines 14 (Fig. 4). The switch parts 10 (Fig. 3) each comprise a row of wires 15 disposed in laterally spaced relation to each other and secured in a block 16 of insulating material molded therearound. The switch parts 10, after being fabricated, are advanced step by step in a horizontal path in spaced relation to each other on a conveyor 17 and are discharged therefrom into the recesses 12 of the magazine 14 disposed at a loading station 18 adjacent the end of the conveyor 17 by means including a reciprocable feed bar 19. A plurality of magazines 14 are individually removably mounted on a plurality of carriers 20 which are supported for vertical movement in a plurality of guides or brackets 22 fixed to a rotatable work table 24 which is automatically indexed to move a filled magazine from the loading station 18 and move an empty magazine therein. Elevating mechanism 26 is provided which operates in timed relation to the reciprocation of the feed bar 19 of the conveyor 17 to elevate the magazine and align successive recesses 12 in the magazine 14 in alignment with the conveyor for receiving successive ones of the switch parts 10.

Figure 2:
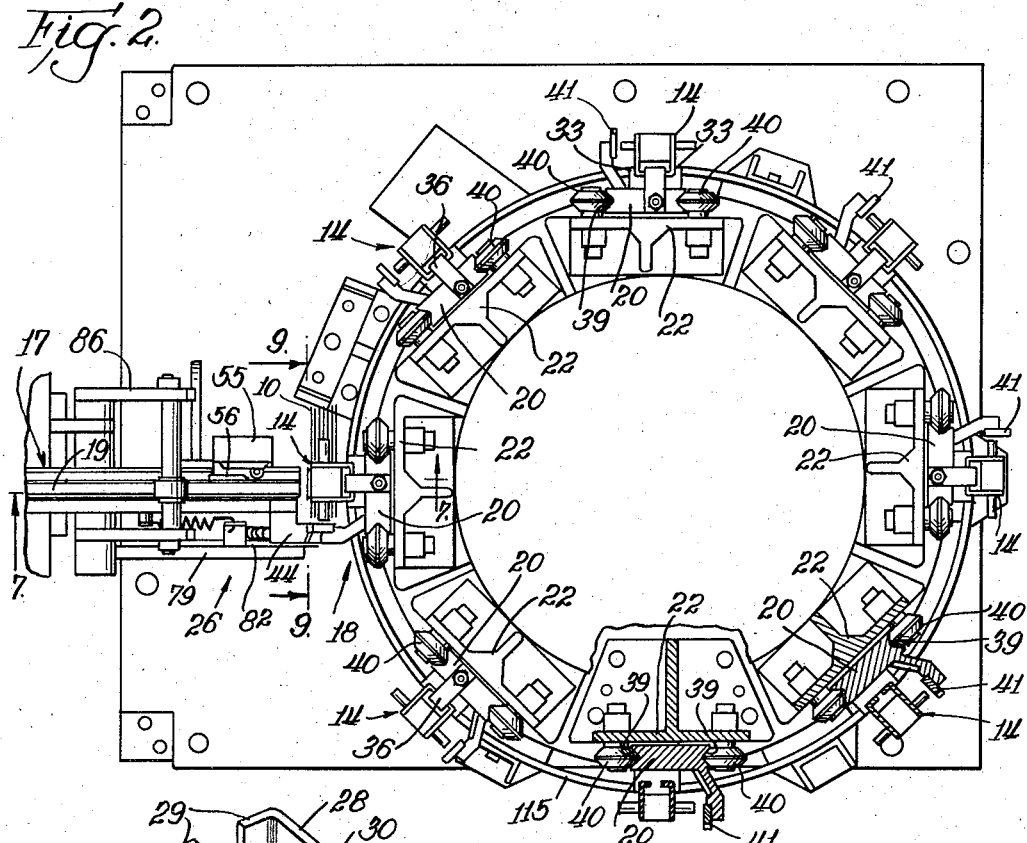
Fig. 2 is a plan view of the apparatus.

The magazine 14 comprises a pair of elongated plates 28—28 having inwardly directed flanges 29 along the rear edge thereof and connected at their upper and lower ends to spacer blocks 30 which are flush with the forward edge of the plates 28 and are spaced from the flanges 29 thereon. Pins 31 extending outwardly from the plates 28 at each end thereof form handles to facilitate the carrying of the magazines. The recesses 12 are in the form of narrow parallel slots formed in the plates 28 and extending inwardly from the forward edges thereof for receiving the row of wires 15 of the switch parts 10, the plates 28 being spaced apart a distance sufficient to receive therebetween the molded blocks 16 of the switch part as shown in Figs. 2 and 9. The recesses or slots 12 are spaced apart predetermined uniform distances to support the switch parts 10 in spaced relation to each other to prevent the wires 15 from becoming entangled with each other.

The magazines 14 are releasably supported on the carriers 20, which are in the form of elongated bars and have spaced lugs 33 at the top and bottom for holding the magazines against lateral displacement. Each of the carriers 20 has a hook-shaped lug 35 fixed to the lower end thereof (Figs. 7 and 8) to provide a seat for receiving the lower end of the flanges 29 of the magazine. The upper end of the magazine 14 is yieldably retained on the carrier by a latch member 36 (Fig. 7) fixed to a rod 37 which is slidably supported for vertical movement in the upper end of the carrier 20 and is urged downwardly by a spring 38.

The vertically movable carriers 20 have V-shaped ways 39 formed on opposite side edges thereof which receive a plurality of guide rollers 40 mounted on the guide brackets 22 fixed to the work table 24 in equi-angularly spaced relation to each other. Ratchet bars 41 having teeth 42 spaced apart uniform distances corresponding to the spacing between the slots 12 of the magazines 14 are provided on the carriers 20 for cooperation with a feed pawl 43 of the elevating mechanism 26 for elevating the magazine and the carrier at the loading station 18 step by step to align successive ones of the slots 12 in a position to receive the parts 10 as they are ejected.

The rotatable work table 24 is supported on and actuated by an indexing mechanism 45 for indexing successive ones of the magazines 14 and carriers 20 to the loading station 18 of the apparatus. The indexing mechanism, which is mounted on a base 46, is of a well known type including a ratchet wheel 47 (Fig. 11) operatively connected to the work table 24, and an actuating element 48 which is reciprocated by a pneumatic actuator 49 and is effective to rotate the wheel 46 and the work table 24 through one eighth of a revolution in response to movement thereof in one direction. Compressed air is supplied to opposite ends of the pneumatic actuator 49 from a suitable supply under control of a solenoid valve 52, which in turn is electrically connected in series with a pair of control switches 54 and 55 to a source of electrical power 56. When the circuit is closed, the pneumatic actuator operates to retract the element 48 and when the control circuit is broken the actuator operates to advance the elements to index the ratchet wheel 47 and the work table 24. The normally open control switch 54 is closed in response to the movement of the magazine to its upper position with the lowermost slot 12 therein in position to receive a switch part 10 and the switch 55 is actuated by a cam 56 which is on the side of the reciprocable feed bar 19 and momentarily closes the switch at the end of each feeding stroke of the bar 19 as it completes the feeding of a switch part 10 into the magazine 14.

The conveyor 17 for intermittently advancing successive switch parts 10 comprises, in addition to the feed bar 19, a lower stationary track 60 (Figs. 5–7) on the flat upper surface of which the switch parts are supported and an upper stationary track 61 which has a narrow guide rail 62 engageable in slots 63 formed on one side of the blocks 16 of the switch parts 10. The stationary tracks 60 and 61 are supported by any suitable means such as brackets 64 and the feed bar 19 is slidably mounted on the upper track 61 for reciprocable movement on a plurality of rollers 66 which fit in elongated slots 67 in the feed bar. A plurality of feed pawls 73 pivotally mounted on the feed bar 19 in a predetermined spaced relation to each other engage the rear edge portions of the blocks 17 of the switch parts 10 for advancing the parts 10 step by step and for ejecting the endmost part 10 from the conveyor 18 into the slot 12 of the magazine 14.

The feed bar 19, as shown diagrammatically in Fig. 11, has a cam follower 68 which rides in a groove of a barrel cam 69, which in turn is rotated through a worm and worm wheel drive 70 from a motor 71. The cam groove of the barrel cam 69 is designed to move the feed bar 19 through a predetermined cycle of reciprocation as shown in the diagram at 75 in Fig. 11, in which the cycle begins at a point 76 and moves rearwardly to the end of its stroke and then moves forwardly to the end of the stroke and then rearwardly a slight distance to the point 76 and dwells there for a predetermined interval of each cycle of operation. The control switch 55 is thus actuated and momentarily closed during the forward movement of the feed bar 19 and is opened as the feed bar 19 is retracted a short distance to its point of dwell.

The feed pawl 43 of the elevating mechanism 26 for elevating the magazine 14 and the carrier 20 step by step after successive switch parts have been fed into the magazine is pivotally mounted on a pin 78 (Fig. 5) on one end by an arm 79, the other end of which is fixed to a shaft 80. A spring 81 on the arm 79 connected to the feed pawl 43 by a link 82 urges the pawl into engagement with the teeth 42 on the ratchet bar 41 of the carrier 20, and a stop pin 83 on the actuating arm 79 limits the oscillatable movement of the pawl 43 when it is not in engagement with the ratchet bar. The shaft 80 is suitably journalled in a bracket 84 fixed to a frame member 85, and the shaft 80 has fixed to it a pair of parallel arms 86 which are obliquely disposed on opposite sides of the conveyor 17 and have a rod 87 connected to their upper ends for supporting a cam roller 88 thereon. A cam 89 on the feed bar 19 cooperates with the cam roller 88 and the arms 86 to impart oscillation to the shaft 80 and the actuating arm 78 for reciprocating the feed pawl 43, and a spring 90 connected to the arm 78 serves to return it to its lower position. The holding pawl 44 is mounted on an arm 94 which is pivotally mounted on a pin 95 on the bracket 83 and is stressed for oscillatable movement in one direction by a spring 96 to yieldably maintain the feed pawl in engagement with the ratchet teeth 43. A stop pin 97 limits the movement of the arm 94 when the pawl 44 is disengaged from the ratchet bar 42. Thus, in response to the rearward movement of the feed bar 19 after the switch part 10 has been fed into a slot 12 of the magazine, the cam 89 effects the upward movement of the feed pawl 43 to elevate the magazine and the carrier one step.

Means are provided for rendering the elevating mechanism inoperative in the event that one of the switch parts 10 is not present in the row of switch parts being advanced by the conveyor 17. The link 82, to one end of which the feed pawl 43 is connected, has its other end connected to an arm 102 pivotally mounted intermediate its ends on a pivot pin 103. The lower end of the arm 102 is in the path of movement of an armature 105 of a solenoid 106 suitably supported on the frame member 85 and electrically connected to a source of current (not shown) through a microswitch 107 (Figs. 5 and 6) which is supported on the bracket 84 and disposed beneath the lower stationary track 60. A trip member 110 in the form of an L-shaped plate is pivotally mounted at 111 to the lower stationary track 60. The upwardly directed portion 112 of the trip member or plate 110 is disposed in a slot in the track and the trip member is held in a normal position by the microswitch 107 with the upper edge thereof extending above the upper surface of the track 60.

As the switch parts 10 are advanced by the reciprocable feed bar 19, the blocks 16 thereof engage the sloping surface of the forward edge of the trip member 110 and cam the trip member downwardly to actuate the normally closed switch 107 and open the circuit to the solenoid 106. When a part 10 is absent from the row of parts on the conveyor 17 adjacent the loading station 18, the trip member 110 is pressed upwardly to its normal position by the switch 107 and the circuit is completed to the solenoid 106 to energize it and cause the armature 105 to actuate the arm 102 and retract the feed pawl 43 from the teeth 42 of the ratchet bar 41 on the carrier 20. Thus, when there is no switch part 10 to be ejected from the conveyor 17 into the magazine 14 and when the feed bar 19 is retracted and the actuating arm 102 is oscillated thereby, the feed pawl 43 is disengaged from the ratchet bar 42 of the carrier 20 and no elevating movement is imparted to the magazine. The row of switch parts 10 are arranged in a predetermined spaced relation to each other on the conveyor 18 and the trip member 110 is of a predetermined length and is positioned relative to the feeding station 18 and a pair of the parts 10 adjacent thereto so that when the row of parts 10 is continuous with none of the parts absent, the trip member 110 is held down by succeeding parts 10 to hold the normally closed switch 107 in its open position to render the feed pawl 43 operable for engaging the ratchet bar 41 and render the elevating mechanism 26 effective to elevate the magazine.

Figure 1:
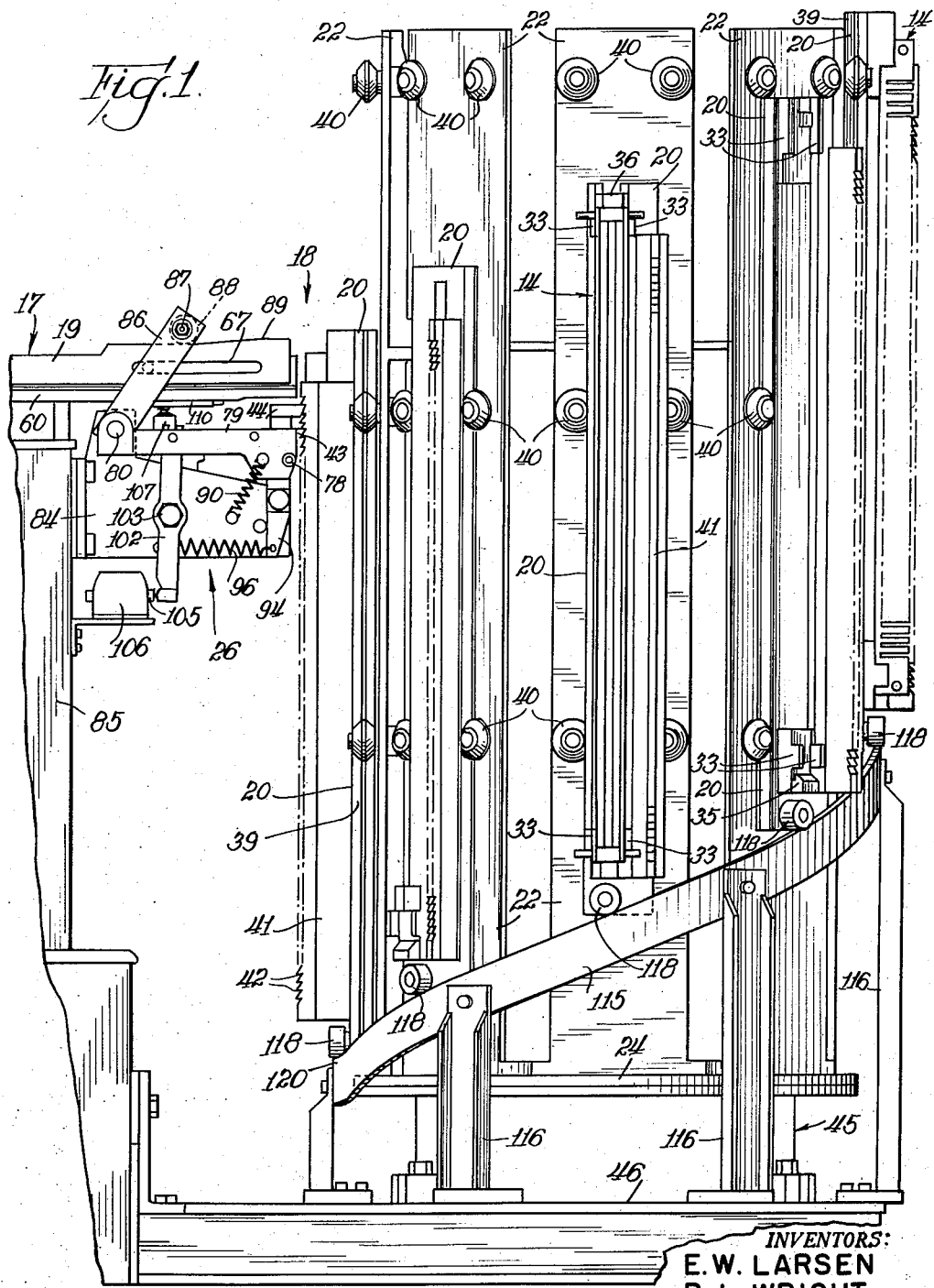
Fig. 1 is a side elevational view of the apparatus embodying the invention.

A helical cam track 115 (Figs. 1, 2, and 9) supported on brackets 116 fixed to the base 46 engages cam rollers 118 rotatably mounted on the lower end of the carriers 20 for supporting the carriers 20 and magazines thereon when they are not being supported by the elevating mechanism 26 at the loading station. The cam track 115 forms one convolution of a helix with the lower horizontal end portion 120 thereof adapted to guide a carrier and magazine to and support them in their lowermost position as they are moved into the loading station 18, and the upper horizontal end portion 121 of the track is positioned at an elevation for engaging the roller 118 and supporting the carrier 20 and the magazine 14 as they are indexed from the loading station.

Means are provided for supporting the carrier 20 in its elevated position during the first portion of its movement from the loading station in response to indexing movement thereof. Slidably mounted on a plate 122 forming the upper portion of the cam track 115 is a curved slide bar 124 (Figs. 9 and 10) which has a rectangular supporting block 125 fixed to one end thereof. A pin 126 on the slide bar 124 extends through a slot 127 in the plate 122 and is movable into and out of engagement with an actuating element 128 of the switch 54 for effecting the opening and closing of the switch in response to the reciprocation of the slide bar 124. A spring 129 connected to the slide bar urges it in a counterclockwise direction as viewed in Fig. 10 into engagement with the side edge of the carrier 20. The upper surface of the supporting block 125 is flush with the flat horizontal surface 121 of the plate 122 and when the carrier 20 has been raised to its uppermost position with the lowermost slot 12 of the magazine carried thereby in alignment with the switch parts 10 on the conveyor 17, the lower flat face 132 of the carrier 22 is positioned at an elevation slightly above the upper surface of the supporting block 125. Thus, when the carrier 20 has been raised to its upper position, the spring 129 moves the slide bar 124 and supporting block 125 to the right as viewed in Figs. 9 and 10 to carry the supporting block under the carrier 20 for supporting it during a portion of its movement as it is indexed from the loading station 18. As the carrier 20 is rotated from the loading station it is supported on the block 125 until the cam roller 118 moves laterally into engagement with the surface 121 of the cam track 115.

As the work table 24 is successively indexed the carriers 20 and the magazines 14 carried thereby are lowered by the cam track 115 from its uppermost position to its lowermost position as it travels through one complete revolution from and back to the loading station 18. The carrier 20 as it moves into the loading station at the lower elevation engages the supporting block 125 and moves it and the slide bar 124 to the position shown in Figs. 6 and 10 and causes the pin 126 to be disengaged from the switch 54 to restore it to its normal open position.

After the magazines 14 have been filled with parts 10 and moved from the loading station 18 they may be removed from the carriers 20 and replaced by empty magazines.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for loading parts into a magazine comprising means including a reciprocable feed bar for intermittently advancing a row of said parts in a predetermined path and ejecting them at a predetermined location, a magazine having a plurality of recesses therein for supporting the parts in spaced relation to each other, means for supporting said magazine for vertical movement to different positions for receiving said parts as they are ejected, elevating means for elevating the magazine step by step at said predetermined location to align successive recesses with said path of travel to receive said parts, means on said feed bar for actuating said elevating means, and means operable in response to the absence of a part in said row at the point of ejection for rendering said elevating means inoperative.

2. In an apparatus for loading parts into a magazine, the combination of means including a reciprocable feed bar for intermittently advancing a row of said parts in a predetermined spaced relation to each other through a predetermined path and for ejecting them at a predetermined location, a magazine having a plurality of recesses therein for supporting said parts, means including a ratchet bar mounted for vertical movement for supporting said magazine in various positions for receiving said parts as they are ejected, an actuating member having a pawl stressed to a normal position in engagement with said ratchet bar, means operable in timed relation to the reciprocation of said feed bar for actuating said member to elevate said supporting means and said magazine step by step to position successive recesses of said magazine to receive said parts, means for holding said magazine in said various positions, means for retracting said feed pawl from said rack bar including a control switch, an element mounted in the path of movement of said row of parts and actuated thereby for actuating the switch whereby in response to the absence of one of said parts from said row of parts said pawl is caused to be retracted and the magazine is not elevated.

3. In an apparatus of the type described, the combination of a plurality of magazines having recesses therein for supporting parts in spaced relation to each other, a plurality of carriers for releasably supporting said magazines, an indexible table having means thereon for supporting the carrier and the magazine for rotary movement into a loading station and for vertical movement at said station, an intermittently operable feed means for feeding parts at a predetermined level into a magazine at said loading station, elevating means operable in timed relation to the feed means for elevating the carrier and the magazine at said loading station to align successive recesses with said feed means, and means responsive to the movement of said carrier to a predetermined upper position for indexing said table to remove a full magazine from the loading position and move an empty magazine thereinto.

4. In an apparatus of the type described, the combination of a plurality of magazines having recesses for supporting parts in spaced relation to each other, a plurality of carriers, means on said carriers for releasably securing said magazines thereto, an indexible table having means thereon for supporting the carrier and the magazine for intermittent movement into a loading station and for intermittent vertical movement at said loading position, feed means for feeding parts at a predetermined level into a magazine at said loading station, elevating means operable in timed relation to the feeding of said parts for elevating the carrier and the magazine at said loading station to align successive recesses with said feed means, means responsive to the movement of said carrier to a predetermined upper position for indexing said table to remove a full magazine from the loading station and move an empty magazine thereinto, and means for supporting a carrier and the magazine thereon at said upper position as it is moved from said loading station and for supporting a carrier and the magazine thereon at a predetermined lower starting position as it is carried by the table into said loading station.

5. In an apparatus of the type described, the combination of a plurality of magazines having recesses therein for supporting parts in spaced relation to each other, a plurality of carriers for releasably supporting said magazines, an indexible table having means thereon for supporting the carriers and the magazines for intermittent rotary movement into a loading station and for step by step vertical movement at said loading station, an intermittently operable feed means for feeding parts at a predetermined level into the magazine at said loading position, elevating means operable in timed relation to the feed means for elevating the carrier and the magazine at said loading station to align successive recesses with said feed means, means responsive to the movement of said carrier to a predetermined upper position for indexing said table to remove a full magazine from the loading station and move an empty magazine thereinto, and guide means for supporting the carrier as it is moved from said loading station and for lowering the carrier and the magazine to a predetermined lower starting position as it is carried by the table into said loading station.

6. In an apparatus of the type described, the combination of a plurality of magazines having recesses therein for supporting parts in spaced relation to each other, a plurality of carriers for releasably supporting said magazine, a table having means thereon for supporting the carrier and the magazine for intermittent rotary movement into a loading station and for vertical movement at said station, feed means including a reciprocable bar for feeding parts at a predetermined level into a magazine at said loading station, elevating means actuated by said reciprocable bar for elevating the carrier and the magazine at said loading station step by step to a predetermined upper position to align successive recesses with said feed means, a helical guide for supporting the carrier as it is moved from said loading station at said predetermined upper position and for lowering the carrier and the magazine to a predetermined lower starting position as it is carried by the table into said station, means movable into an operative position in response to the movement of a carrier to said upper position for supporting the carrier for movement from said loading station onto the upper end of said helical guide, and means operable in response to the movement of said last-named means to its upper position and the feeding of a part into the magazine in said upper position for indexing said table to remove a full magazine from the loading station and move an empty magazine thereinto.

7. In an apparatus for loading parts, the combination of a magazine having a plurality of recesses therein for supporting the parts in spaced relation to each other, means for supporting said magazine for vertical movement at a loading station, means including a reciprocable feed bar for advancing said parts along a horizontal path into said magazine, means actuated by said feed bar for imparting vertical movement to said magazine to align successive recesses therein with said path of travel of said parts to receive said parts, and means operable in response to vertical movement of said magazine to a predetermined position for moving the loaded magazine from the loading station.

8. In an apparatus for loading parts, the combination of a magazine having a plurality of recesses therein for supporting the parts in vertically spaced relation to each other, means for supporting said magazine for vertical movement at a loading station, means for feeding said parts at a predetermined level into a magazine at said loading station, means operable in timed relation to said feeding means for raising the magazine to align successive recesses therein with the parts on said feeding means to receive said parts, and means operable in response to vertical movement of the magazine to a predetermined upper position at said loading station for moving the loaded magazine from the loading station and for moving an empty magazine thereinto at a predetermined lower position.

9. In an apparatus for loading parts, the combination of a plurality of vertically disposed magazines having vertically spaced recesses for supporting the parts therein in spaced relation to each other, means for supporting said magazines for movement into and out of a loading station, conveyor means for moving said parts in a straight path into a magazine at the loading station, actuating means operable in timed relation to said conveyor means for raising a magazine at said loading station to align successive recesses with the path of travel of said parts to receive the parts advanced by said conveyor means, means for indexing said magazine supporting means in response to the movement of said magazine to a predetermined elevation at said loading station to remove a loaded magazine from said loading station and to move an empty magazine therein.

10. In an apparatus of the type described, the combination of a plurality of magazines having recesses therein for supporting parts in spaced relation to each other, a rotatable table having means thereon for supporting the magazines for movement into a loading station and for vertical movement at said station, means for feeding parts at a predetermined level into a magazine at said loading station, means operable in timed relation to the feeding means for raising the magazine at said loading station to align successive recesses with said feed means for receiving the parts thereon, and means responsive to the movement of said magazine to a predetermined upper position for indexing said table to remove a full magazine from the loading position and move an empty magazine thereinto.

11. In an apparatus of the type described, the combination of a plurality of magazines having recesses therein for supporting parts in spaced relation to each other, a rotatable table having means thereon for supporting the magazines for movement into a loading station and for vertical movement at said station, means for feeding parts at a predetermined level into a magazine at said loading station, means operable in timed relation to the feed means for raising the magazine at said loading station to align successive recesses with said feed means for receiving the parts, means responsive to the movement of said magazine to a predetermined upper position for indexing said table to move a full magazine from the loading position and move an empty magazine thereinto, and means including a stationary cam track for lowering the magazines on said feed table from said upper position as they are moved from said loading station to a predetermined lower position for movement into said loading station.

12. In an apparatus for loading parts into magazines, the combination of a plurality of vertically disposed magazines having vertically spaced recesses for supporting the parts therein in spaced relation to each other, means for supporting said magazines for vertical movement and for lateral movement into and out of a loading station, conveyor means including a reciprocable feed bar for intermittently advancing a row of parts at a predetermined level into a magazine at the loading station, elevating means actuated by said feed bar for raising the magazine in the loading station to align successive recesses with said predetermined level to receive the parts advanced by said conveyor means, means operable in response to vertical movement of said magazine to a predetermined position at said loading station for indexing said magazine supporting means to move the loaded magazine from said loading station and to move the empty magazine therein, and means operable in response to the absence of a part in said row for rendering said elevating means inoperative.

References Cited in the file of this patent

UNITED STATES PATENTS

| | | |
|---|---|---|
| 708,218 | French | Sept. 2, 1902 |
| 817,375 | Keyes | Apr. 10, 1906 |
| 1,367,852 | Becker et al. | Feb. 8, 1921 |
| 1,534,338 | Weihmann | Apr. 21, 1925 |
| 1,889,846 | Wright | Dec. 6, 1932 |
| 1,984,938 | Mason et al. | Dec. 18, 1934 |
| 2,297,583 | Rowlands | Sept. 29, 1942 |
| 2,658,652 | Bloxham | Nov. 10, 1953 |
| 2,661,100 | Ashford | Dec. 1, 1953 |